US010742410B2

(12) United States Patent
Gehrmann et al.

(10) Patent No.: US 10,742,410 B2
(45) Date of Patent: Aug. 11, 2020

(54) UPDATING BIOMETRIC TEMPLATE PROTECTION KEYS

(71) Applicant: FINGERPRINT CARDS AB, Göteborg (SE)

(72) Inventors: Christian Gehrmann, Lund (SE); Steven Pope, Holte (DK)

(73) Assignee: FINGERPRINT CARDS AB, Gothenburg (SE)

( * ) Notice: Subject to any disclaimer, the term of this patent is extended or adjusted under 35 U.S.C. 154(b) by 0 days.

(21) Appl. No.: 16/605,828

(22) PCT Filed: Feb. 8, 2019

(86) PCT No.: PCT/SE2019/050107
§ 371 (c)(1),
(2) Date: Oct. 17, 2019

(87) PCT Pub. No.: WO2019/160472
PCT Pub. Date: Aug. 22, 2019

(65) Prior Publication Data
US 2020/0127824 A1    Apr. 23, 2020

(30) Foreign Application Priority Data
Feb. 13, 2018   (SE) ...................................... 1850151

(51) Int. Cl.
*H04L 9/08*      (2006.01)
*H04L 9/32*      (2006.01)
*G06F 21/32*     (2013.01)

(52) U.S. Cl.
CPC ............ *H04L 9/0891* (2013.01); *G06F 21/32* (2013.01); *H04L 9/0869* (2013.01); *H04L 9/3231* (2013.01)

(58) Field of Classification Search
CPC .................................................. H04L 9/0891
(Continued)

(56) References Cited

U.S. PATENT DOCUMENTS

| 8,406,428 B2 * | 3/2013 | Bauchot ................. G06F 21/32 380/282 |
| 10,305,690 B1 | 5/2019 | Gehrmann et al. |

(Continued)

FOREIGN PATENT DOCUMENTS

| CN | 101005357 A | 7/2007 |
| EP | 1912154 A2 | 4/2008 |
| KR | 20090042143 A | 4/2009 |

OTHER PUBLICATIONS

PCT International Search Report and Written Opinion dated Apr. 30, 2019 for International Application No. PCT/SE2019/050107, 10 pages.

*Primary Examiner* — Peter C Shaw
(74) *Attorney, Agent, or Firm* — RMCK Law Group, PLC (57) ABSTRACT

Methods and devices for updating biometric template protection keys can include updating at least one stored feature transformation key with which a set of biometric data of a user initially has been transformed at a first client device at which the biometric data of the user was captured and enrolled with a network node, which set of transformed biometric data of the user is stored at a biometric data verification node that does not have access to the feature transformation key. The method comprises generating random data, computing at least one new feature transformation key based on said random data, replacing the at least one stored feature transformation key with the computed at least one new feature transformation key, and transmitting the generated random data to the biometric data verification node, which uses the generated random data to update the at least one set of transformed biometric data.

20 Claims, 5 Drawing Sheets

(58) Field of Classification Search
USPC .......................................................... 713/186
See application file for complete search history.

(56) References Cited

U.S. PATENT DOCUMENTS

| | | |
|---|---|---|
| 2006/0078171 A1 | 4/2006 | Govindaraju et al. |
| 2009/0113209 A1 | 4/2009 | Lee et al. |
| 2009/0271634 A1* | 10/2009 | Boult .................... H04L 9/0866 |
| | | 713/186 |
| 2010/0205660 A1 | 8/2010 | Griffin |
| 2012/0013437 A1 | 1/2012 | Yokoi et al. |
| 2013/0174243 A1 | 7/2013 | Inatomi et al. |
| 2015/0288681 A1* | 10/2015 | Park .................... H04L 63/0846 |
| | | 726/6 |
| 2017/0085562 A1* | 3/2017 | Schultz ............... H04L 63/0861 |

* cited by examiner

UPDATING BIOMETRIC TEMPLATE PROTECTION KEYS

CROSS-REFERENCE TO RELATED APPLICATIONS

This application is a 371 U.S. National Stage of International Application No. PCT/SE2019/050107, filed Feb. 8, 2019, which claims priority to Swedish Patent Application No. 1850151-0, filed Feb. 13, 2018. The disclosures of each of the above applications are incorporated herein by reference in their entirety.

TECHNICAL FIELD

The invention relates to methods and devices for updating biometric template protection keys.

BACKGROUND

Biometrics-based identification is a user-friendly way to securely authenticate human users. One major problem with biometric data when using it for identification purposes in distributed systems is that template biometric data must be available at a node in a computer system where the end-user is supposed to be identified. This constitute a major security design challenge in distributed computer system as this typically requires original, clear text biometric data to be stored at a central node and distributed in the system. Such solutions are very vulnerable to original biometric data compromise, and data compromised on one system may lead to a situation where the same biometric data is compromised on all other systems as well where the biometric data is used. Simply encrypting the biometric data will not solve this problem as the original biometric data must be available at the remote location during authentication.

Hence, there is a need to provide solutions that allow remote authentication based on biometric identification but at the same time provide protection of the original biometric data, and to be able to update biometric data protection keys.

SUMMARY

An object of the present invention is to solve, or at least mitigate, this problem in the art and to provide a method of updating keys used for protecting stored biometric data of a user.

This object is attained in a first aspect of the invention by a method performed by a network node of updating at least one stored feature transformation key with which a set of biometric data of a user initially has been transformed at a first client device at which the biometric data of the user was captured and enrolled with the network node, which set of transformed biometric data of the user is stored at a biometric data verification node without the biometric data verification node having access to the feature transformation key. The method comprises determining that said at least one stored transformation key is to be updated, generating random data, computing at least one new feature transformation key based on said random data, replacing the at least one stored feature transformation key with the computed at least one new feature transformation key, and transmitting the generated random data to the biometric data verification node, wherein the biometric data verification node uses the generated random data to update the at least one set of transformed biometric data which initially was transformed using the replaced at least one feature transformation key.

This object is attained in a second aspect of the invention by a method performed by a biometric data verification node of updating at least one stored set of transformed biometric data of a user initially transformed at a first client device at which the biometric data of the user was captured and enrolled with the biometric data verification node. The method comprises receiving, from a network node having access to a feature transformation key that was used to transform the stored set of transformed biometric data to be updated, random data to be used for updating the stored set of transformed biometric data to be updated, updating the at least one stored set of transformed biometric data by processing the stored set of transformed biometric data with the received random data such that the updated set of transformed biometric data will match a set of biometric data of the user transformed with a feature transformation key correspondingly updated based on said random data generated at the network node, and replacing the at least one stored set of transformed biometric data with the updated set of transformed biometric data.

This object is attained in a third aspect of the invention by a network node configured to update at least one stored feature transformation key with which a set of biometric data of a user initially has been transformed at a first client device at which the biometric data of the user was captured and enrolled with the network node, which set of transformed biometric data of the user is stored at a biometric data verification node without the biometric data verification node having access to the feature transformation key. The network node comprises a processing unit being configured to cause the network node to be operative to determine that said at least one stored transformation key is to be updated, generate random data, compute at least one new feature transformation key based on said random data, replace the at least one stored feature transformation key with the computed at least one new feature transformation key, and transmit the generated random data to the biometric data verification node, wherein the biometric data verification node uses the generated random data to update the at least one set of transformed biometric data which initially was transformed using the replaced at least one feature transformation key.

This object is attained in a fourth aspect of the invention by a biometric data verification node configured to update at least one stored set of transformed biometric data of a user initially transformed at a first client device at which the biometric data of the user was captured and enrolled with the biometric data verification node. The biometric data verification node comprises a processing unit being configured to cause the biometric data verification node to be operative to receive, from a network node having access to a feature transformation key that was used to transform the stored set of transformed biometric data to be updated, random data to be used for updating the stored set of transformed biometric data to be updated, update the at least one stored set of transformed biometric data by processing the stored set of transformed biometric data with the received random data such that the updated set of transformed biometric data will match a set of biometric data of the user transformed with a feature transformation key correspondingly updated based on said random data generated at the network node, and replace the at least one stored set of transformed biometric data with the updated set of transformed biometric data.

Hence, it is determined that transformation keys are to be updated, for instance by the biometric data verification node—referred to herein as a biometrics trusted server (BTS)—sending an updated request to the network node, referred to herein as an application server (AS), accordingly. The BTS may request anywhere from a single key to hundreds or even thousands of keys to be updated.

The BTS thus indicates which transformation keys are to be updated, for instance by including a user index in the update request, which index is unique for each enrolled set of transformed biometric data of a user.

The AS determines from the update request which of the stored feature transformation keys should be updated.

The AS will then generate random data and compute new feature transformation keys based on the generated random data. Thereafter, each updated feature transformation key replaces each corresponding previously stored key.

The AS transmits the generated random data to the BTS, which in a similar manner will use the received random data to updated stored sets of transformed biometric data corresponding to the previously sent user indices. That is, the stored sets of transformed biometric data previously having been transformed with the feature transformation keys that were updated at the AS must also be updated at the BTS.

Hence, the BTS updates the stored sets of transformed biometric data by processing the stored sets of transformed biometric data with the received random data such that the updated sets of transformed biometric data will match a set of biometric data of the user transformed with a feature transformation key correspondingly updated based on the random data generated at the AS.

After having updated the stored sets of transformed biometric data, the updated sets replace each corresponding previously stored sets of transformed biometric data.

The BTS may optionally send an update confirmation to the AS to indicate that the update procedure has been completed.

As can be concluded, the sets of transformed biometric data stored at the BTS and the corresponding feature transformation keys stored at the AS are advantageously updated without involving a user.

Further advantageous is that the feature transformation key that was stored at the AS prior to being updated is now obsolete, and thus cannot be used by a potential malicious third party having access to the key.

The updating of the second feature transformation key may advantageously be performed on a regular basis. Hence, a computed new feature transformation key may be updated after a set time period, such that all feature transformation keys stored at the AS—and the corresponding sets of transformed biometric data stored at the BTS—are continuously updated.

In an embodiment, the computation of the at least one new feature transformation key at the network node based on said random data is performed by adding the generated random data to the at least one stored feature transformation key.

Similarly, the update of the at least one stored set of transformed biometric data at the biometric data verification node is performed by adding the generated random data to the at least one stored set of biometric data.

In a further embodiment, the biometric data verification node transmits a request to the network node to update said at least one stored transformation key, the request comprising a unique identifier of said at least one stored transformation key to be updated.

In another embodiment, the transmission of the generated random data to the biometric data verification node further comprises a unique identifier of said at least one stored transformation key having been updated.

Further embodiments of the invention will be described in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
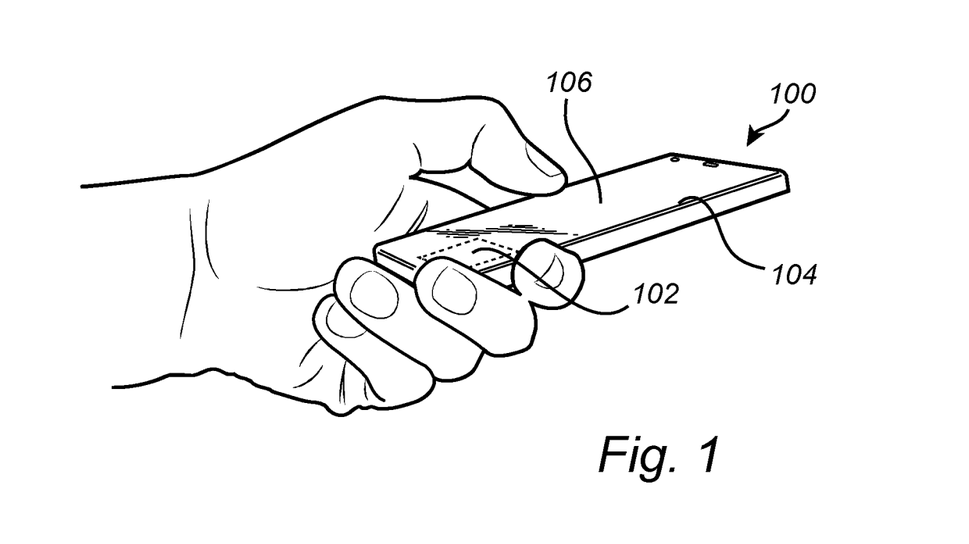
FIG. 1 shows an electronic device in the form of a smart phone used to captured biometric data of a user in an embodiment.

FIG. 1 shows a client device 100 in the form of a smart phone being equipped with a fingerprint sensor 102 and a display unit 104 with a touch screen interface 106. The fingerprint sensor 102 may, for example, be used for unlocking the mobile phone 100 and/or for authorizing transactions carried out using the mobile phone 100, etc. The fingerprint sensor 102 may alternatively be placed on the backside of the mobile phone 100. It is noted that the fingerprint sensor 102 could be integrated in the display unit/touch screen or form part of a smart phone home button.

It is understood that the fingerprint sensor 102 according to embodiments of the invention may be implemented in other types of electronic devices, such as laptops, remote controls, tablets, smart cards, etc., or e.g. being part of an operating panel of vehicle such as a car, or any other type of present or future similarly configured device utilizing fingerprint sensing.

Alternatively, biometric data of a user may be captured using other devices than fingerprint sensors, such as e.g. iris or face recognition sensors. It may further be envisaged that a combination of sensors is used, such as a fingerprint sensor in combination with an iris or face recognition sensor.

Figure 2:
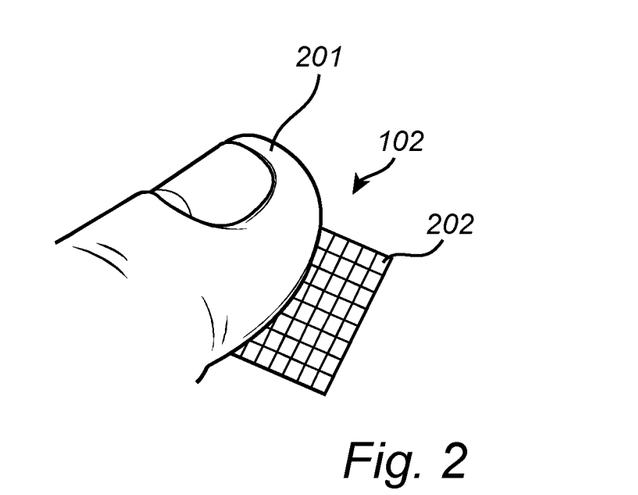
FIG. 2 shows a view of a fingerprint sensor onto which a user places the finger.

FIG. 2 illustrates a somewhat enlarged view of the fingerprint sensor 102 onto which a user places her finger 201.

In the case of employing a capacitive sensing technology, the fingerprint sensor 102 is configured to comprise a plurality of sensing elements. A single sensing element (also denoted as a pixel) is in FIG. 2 indicated by reference numeral 202.

Figure 3:
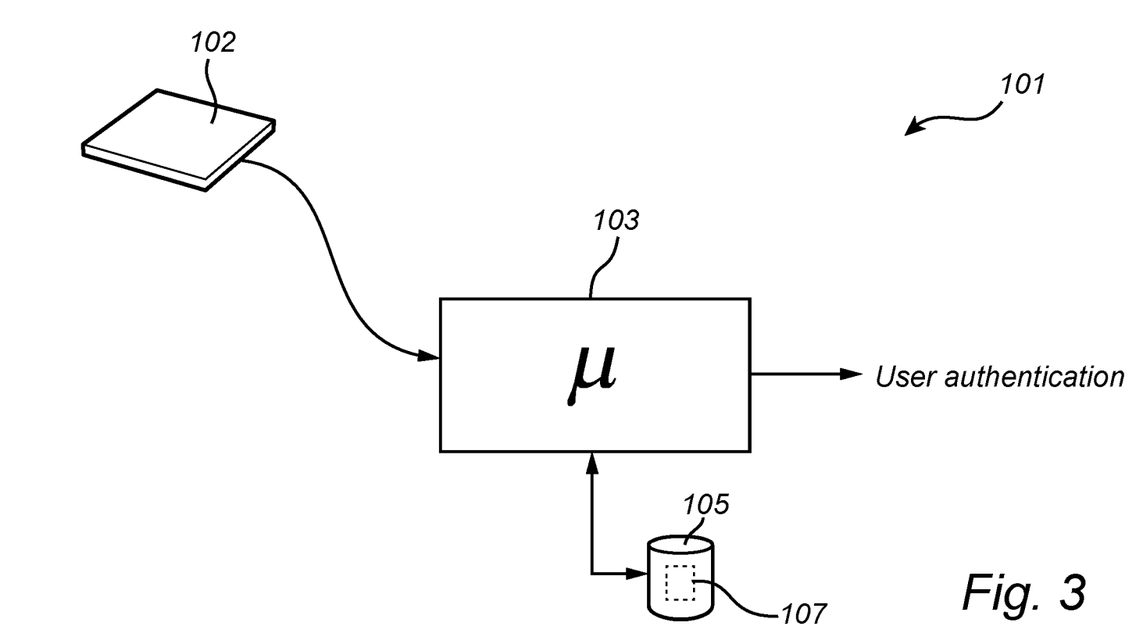
FIG. 3 shows a fingerprint sensor being part of a fingerprint sensing system according to an embodiment.

FIG. 3 shows the fingerprint sensor 102 being part of a fingerprint sensing system 101. The fingerprint sensing system 101 comprises the fingerprint sensor 102 and a processing unit 103, such as a microprocessor, for controlling the fingerprint sensor 102 and for analysing captured fingerprints. The fingerprint sensing system 101 further comprises a memory 105. The fingerprint sensing system 101 in turn, typically, forms part of the electronic device 100 as exemplified in FIG. 1.

Now, upon an object contacting the fingerprint sensor 102, the sensor 102 will capture an image of the object in order to have the processing unit 103 determine whether the object is a fingerprint of an authorised user or not by comparing the captured fingerprint to one or more authorised fingerprint templates pre-stored in the memory 105.

The fingerprint sensor 102 may be implemented using any kind of current or future fingerprint sensing principle, including for example capacitive, optical, ultrasonic or thermal sensing technology. Currently, capacitive sensing is most commonly used, in particular in applications where size and power consumption are important. Capacitive fingerprint sensors provide an indicative measure of the capacitance between (see FIG. 2) several sensing elements 202 and a finger 201 placed on the surface of the fingerprint sensor 102. Acquisition of a fingerprint image is typically performed using a fingerprint sensor 102 comprising a plurality of sensing elements 202 arranged in a two-dimensional manner.

In a general authorization process, in case a fingerprint sensor is used, the user places her finger 201 on the sensor 102 for the sensor to capture an image of the fingerprint of the user. The processing unit 103 evaluates the captured fingerprint and compares it to one or more authenticated fingerprint templates stored in the memory 105. If the recorded fingerprint matches the pre-stored template, the user is authenticated and the processing unit 103 will typically instruct the smart phone 100 to perform an appropriate action, such as transitioning from locked mode to unlocked mode, in which the user is allowed access to the smart phone 100.

With reference again to FIG. 3, the steps of the method performed by the fingerprint sensing system 101 (apart from capturing the image, which is carried out by the sensor 102) are in practice performed by the processing unit 103 embodied in the form of one or more microprocessors arranged to execute a computer program 107 downloaded to the storage medium 105 associated with the microprocessor, such as a Random Access Memory (RAM), a Flash memory or a hard disk drive. The processing unit 103 is arranged to cause the fingerprint sensing system 101 to carry out the method according to embodiments when the appropriate computer program 107 comprising computer-executable instructions is downloaded to the storage medium 105 and executed by the processing unit 103. The storage medium 105 may also be a computer program product comprising the computer program 107. Alternatively, the computer program 107 may be transferred to the storage medium 105 by means of a suitable computer program product, such as a Digital Versatile Disc (DVD) or a memory stick. As a further alternative, the computer program 107 may be downloaded to the storage medium 105 over a network. The processing unit 103 may alternatively be embodied in the form of a digital signal processor (DSP), an application specific integrated circuit (ASIC), a field-programmable gate array (FPGA), a complex programmable logic device (CPLD), etc. It should further be understood that all or some parts of the functionality provided by means of the processing unit 103 may be at least partly integrated with the fingerprint sensor 102.

Figure 4:
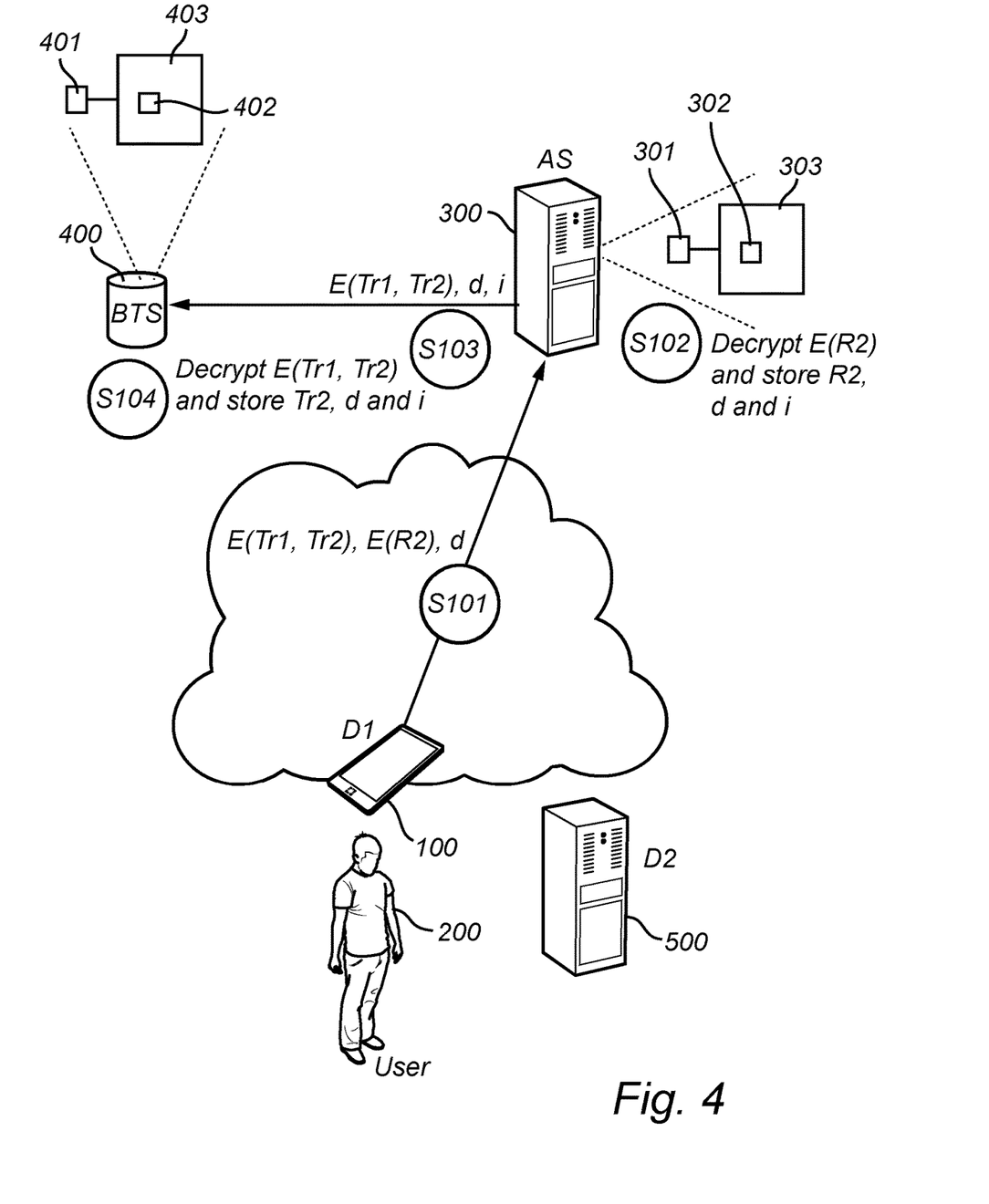
FIG. 4 illustrates a signaling diagram of enrolling transformed biometric data of a user at a trusted server according to an embodiment.

FIG. 4 illustrates a system in which the present invention may be implemented. This system is described in Swedish patent application no. 1751469-6.

In the system of FIG. 4, a first client device 100 will enroll biometric data of a user 200 with a network node referred to as an application server (AS) 300 over a secure communication channel. The application server 300 will in its turn enroll some of the biometric data of the user 200 at a biometric data verification node referred to as a biometrics trusted server (BTS) 400.

In brief, the first client device 100 embodied e.g. in the form of a smart phone captures biometric data of the user 200, e.g. in the manner described with reference to FIGS. 1-3 using for instance a fingerprint sensor, an iris sensor, a face recognition sensor, etc.

This biometric data is then protected at the smart phone 100 using for instance a feature transform and securely registered, or enrolled, with the remotely located trusted AS 300, which stores a subset of the received data (but not the biometric data itself in any form), and forwards the protected biometric data to the BTS 400.

Subsequently, the user 200 will authenticate herself at a local computing station 500, i.e. a second client device, by having the computing station 500 capture the biometric data of the user, protect the captured biometric data in the manner previously performed by the smart phone 100 during enrollment, and send the protected biometric data to the BTS 400 (via the AS 300) to match the protected biometric data with the protected biometric data that previously was enrolled with the BTS 400.

For instance, the AS 300 may provide one or more services that the user 200 wishes to access, such as an e-commerce service with which the user 200 authenticates herself using biometric data instead of a Personal Identification Number (PIN) to effect a payment of goods bought via the e-commerce service.

This means that the user can login to a remote Web service provided by the AS 300 by presenting her biometric information with an arbitrary (trusted) device supporting the remote authentication procedure. Hence, there is no need for the user to remember any username and/or password or any requirement to carry a certain hardware token, or having a special purpose identification program or credentials stored on the client device used for the login.

Upon successful authentication, the user 200 will be given access to the service provided by the AS 300. It is noted that a clear-text copy of the biometric data of the user 200 never leaves the smart phone 100 or the local computing station 500. It is envisaged that the AS 300 provides a plurality of services, and that different services may be provided to different identified users.

It is noted that the authentication process for the user 200 alternatively may be performed at the first client device 100, i.e. the same device that enrolled the biometric data of the user 200.

It is also possible that the users register with the AS 300 via any one of the local computing stations 500 as an alternative to using their smart phone 100.

In another example, the AS 300 belongs to a service provider such as a car rental company and the second client device 500 could be embodied in the form of a car key device with a biometric reader. When used for this application, the car rental company may handle its customers completely online and having car keys available to customers also at unsafe places (out of office hours and at remote locations) without having a high risk of cars being stolen as car keys only can be activated by a user who actually has ordered and payed for a particular car. The user can trust the system as it ensures that the biometric data of the user—even if the biometric data is transferred to the car rental company—never will be available to the car rental company outside the car key device, which can be assumed to be secure.

Figure 5:
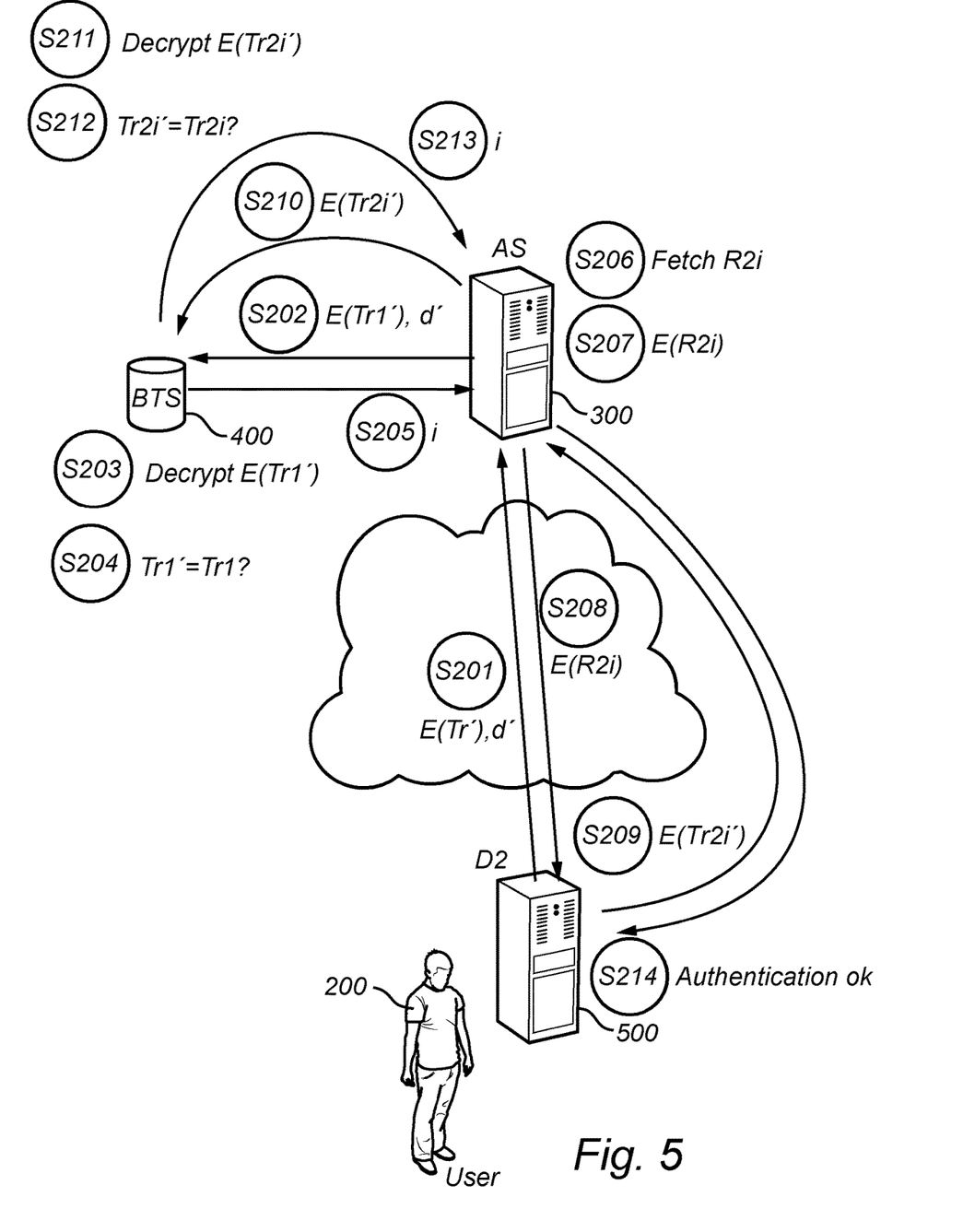
FIG. 5 illustrates a signaling diagram of authenticating a user based on the enrolled transformed biometric data according to another embodiment.

Both the enrollment and the authentication procedure will now be described in some more detail in FIGS. 4 and 5, respectively.

With reference to FIG. 4, the smart phone 100 captures biometric data T of the user 200, using e.g. a fingerprint sensor, an iris sensor or face recognition sensor as described with reference to FIGS. 1-3.

The smart phone 100 then transforms the captured biometric data T into a first transformed biometric data set Tr1, using a suitable feature transform scheme, i.e. a feature transform function that takes an original biometrics template representation and a suitable transform parameter as input parameters and produces a transformed biometrics template information as output.

This may for instance be performed using a secret first feature transformation key R1 having been generated at the smart phone 100 by means of an appropriate pseudorandom function (PRF). Alternatively, the smart phone 100 is preconfigured with the secret first feature transformation key R1 or supplied with the secret first feature transformation key R1 by the AS 300.

The first feature transformation key R1 used during enrollment must be shared with any other client device at which the user is to be authenticated, such as e.g. the local computing station 500. The first transformed biometric data set is thus denoted Tr1=F(R1, T).

The smart phone 100 then generates a second feature transformation key R2 and creates a second transformed biometric data set based on the captured biometric data T: Tr2=F(R2, T).

The second feature transformation key R2 is unique for each enrolled set of biometric data, commonly referred to as a template, and will be accessible by the AS 300. The BTS will neither have access to R1 nor R2, and will store the transformed sets of biometric data Tr1 and Tr2. Hence, neither the AS 300 nor the BTS 400 will have access to clear-text biometric data.

As indicated in step S101, the first and second set of transformed biometric data Tr1, Tr2 are sent by the smart phone 100 to the AS 300 after having been encrypted with a key shared with the BTS 400, resulting in E(Tr1, Tr2). It is noted that the sets may be provided with authenticity before being transmitted, using for instance a symmetric key shared between the smart phone 100 and the AS 300. However, only the main outlines of the system of FIG. 4 will be described in the following.

The smart phone further encrypts the second feature transformation key R2 with an encryption key shared with the AS 300 and includes the encrypted second feature transformation key, E(R2), with the transmission of S101.

Upon receiving the encrypted data, the AS 300 will decrypt the encrypted second feature transformation key E(R2) and store the key R2 securely in step S102, while forwarding the encrypted first and second set of transformed biometric data E(Tr1, Tr2) to the BTS 400 in step S103.

It is noted that both R2 and Tr1, Tr2 typically are associated with user profile data d such that the data sets subsequently may be mapped to corresponding user profile data d provided by a user during the authentication process in order to perform template matching.

Further, the AS 300 generates a unique user index i for the received second feature transformation key R2 and stores the user profile data d and the user index i along with the second feature transformation key R2 in step S102, and includes the user index i in the transmission to the BTS 400 in step S103. It is noted that in case the smart phone 100 enrolls a plurality of biometric templates, a unique user index is generated for each correspondingly received second feature transformation key R2.

In the final steps of the enrollment procedure, the BTS 400 thus receives, from the AS 300 in step S103, the enrollment request comprising the encrypted first and second sets of transformed biometric data E(Tr1, Tr2) along with the user profile data d and the user index i.

The BTS 400 uses a decryption key corresponding to the encryption key used at the smart phone 100 to decrypt the encrypted transformed biometric data.

Thereafter, the BTS 400 securely stores the first transformed biometric data set Tr1, the second transformed biometric data set Tr2, the user profile data d and the user index i in step S104.

As can be concluded, the BTS 400 does not have access to any one of the first and second feature transformation keys R1, R2, and is thus advantageously incapable of obtaining a clear-text copy of the biometric data T.

Now, a user wishing to access any of the previously mentioned services of the AS 300 via the local computing station 500 will need to authenticate herself, via the AS 300, with the BTS 400 with which she previously has enrolled, as will be illustrated with reference to the signaling diagram of FIG. 5.

Hence, the user (which in this particular example is assumed to be the user 200 that enrolled with the trusted server in steps S101-S104) may submit a request to the AS 300 to authenticate the user 200 of the second client device, i.e. the local computing station 500.

The local station 500 (being equipped with a suitable biometric sensor) captures biometric data T' of the user 200 and transforms the captured biometric data T' into a first transformed biometric data set Tr1' with the first feature transformation key R1 used by the smart phone 100 during enrollment of the first set of transformed biometric data Tr1; Tr1'=F(T', R1).

Further, the local station 500 encrypts the first set of transformed biometric data Tr1' with a key shared with the BTS 400 at which the user 200 is to be authenticated, which is denoted E(Tr1') and transmits E(Tr1') to the AS 300 in step S201 along with user profile data d' corresponding to the already enrolled user profile data d for this particular user 200 (given that the user to be authenticated indeed is the user that previously enrolled with user profile data d). Again, any transmitted data may be provided with an indication of authenticity to be verified by the receiving party.

The AS 300 will in its turn submit the encrypted first set of transformed biometric data E(Tr1') and the user profile data d' to the BTS 400 in step S202.

The BTS 400 decrypts the encrypted first set of transformed biometric data E(Tr1') in step S203 and matches the decrypted first set of transformed biometric data Tr1' to at least one set of transformed biometric data Tr1 having been previously enrolled for the received user profile data d', i.e. for which d'=d, in step S204.

It should be noted that the BTS 400 typically stores a large number of enrollments; thousands of users may be enrolled with the BTS 400. Further, the user profile data may be embodied in the form of for example end user name, geographical location, network, etc., i.e. it may not necessarily uniquely identify a user, but rather a group of users. A plurality of enrolled transformed biometric data sets $Tr1_i$ stored at the BTS 400 may thus be considered to match the received first set of transformed biometric data Tr1'. These are referred to as candidate enrollment sets.

Therefore, for each matching transformed biometric data set constituting the candidate enrollment sets, the BTS 400 returns the associated user index i to the AS 300 in step S205.

Hence, a "pre-match" is advantageously performed at the BTS 400 utilizing the received first set of transformed biometric data Tr1' to fetch the adequate candidate enrollment sets, having as an effect that a largely reduced number of candidate enrollment sets subsequently will need to be considered by the computing station 500 as compared to a scenario where the pre-match is not performed.

Now, upon receiving the user indices i in step S205, the AS 300 fetches, from an appropriate storage, a previously enrolled second feature transformation key $R2_i$ associated with each particular user index i in step S206, encrypts each enrolled second feature transformation key $R2_i$ with a key shared with the local station 500 in step S207 and sends $E(R2_i)$ to the local station 500 in step S208.

The local station 500 decrypts the encrypted (at least one) second feature transformation key and uses each received second feature transformation key $R2_i$ to transform the captured biometric data T' into a corresponding number i of second sets of transformed biometric data: $Tr2_i'=(T', R2_i)$.

The local station 500 further encrypts the second set(s) of transformed biometric data with an encryption key shared with the BTS 400 and sends the result $E(Tr2_i')$ to the AS 300 in step S209.

The AS 300 will in its turn forward $E(Tr2_i')$ to the BTS 400 in step S210 for final matching. The AS 300 may forward each encrypted second set of transformed biometric data $E(Tr2_i')$ in the same order as the candidate enrollment sets previously were received from the BTS 400. If so, the BTS 400 knows to which particular user index i each respective encrypted second set of transformed biometric data $E(Tr2_i')$ belongs when performing the matching.

The BTS 400 decrypts the encrypted at least one second set of transformed biometric data $E(Tr2_i')$ in step S211 and matches the decrypted second sets of transformed biometric data $Tr2_i'$ in step S212 to the corresponding second sets of transformed biometric data $Tr2_i$ having been previously enrolled for the user index i. Again, since at least one second set of transformed biometric data Tr2 is enrolled for each user—the number of users amounting to hundreds or even thousands—the matching may be a burdensome task in terms of data processing; the BTS 400 is typically more powerful in terms of processing power as compared to the local station 500.

Finally, the BTS 400 sends in step S213 to the AS 300, at least one user index i for which there is match among the second sets of transformed biometric data $Tr2_i$, wherein the user 200 is considered authenticated.

Upon receiving the confirmation from the BTS 400 that at least one of the second sets of transformed biometric data Tr2' has been matched to a previously enrolled second set of transformed biometric data Tr2, the AS 300 concludes that the user 200 at the local station 500 has been authenticated (and possibly even identified by means of the user profile data d associated with any received user index i), and may send a confirmation to the local station 500 accordingly in step S214, in which case the user 200 for instance is given access to, via the computing station 500, a service provided by the AS 300.

Advantageously, as can be concluded from the above, no clear text biometric data leaves either of the client devices 100, 500, while secure authentication still is provided, which considerably can increase a user's trust in using the system.

Now, while this solution gives a high security level and robustness to attack, the rare event that the BTS 400 or the AS 300 is partly or completely compromised will be considered as proposed by embodiments of the invention to be described in the following.

By regularly updating one or more of the second feature transformation keys R2 held by the AS 300 and using the updated second feature transformation keys R2 to update the corresponding second sets of transformed biometric data Tr2 at the BTS 400, the time-window for a potential attack is drastically reduced. That is, in the event of a successful attack on one or both of the servers; by the time the attacker has recovered the critical key, the key is already obsolete and a template has been re-protected with a new key. Further advantageous is that these updates may be performed automatically and require no user involvement.

The updating of one or more of the second feature transformation keys R2 held by the AS 300 may be advocated for a number of reasons.

For instance, it may indeed have been detected that an attempt has been made to compromise the keys. However, it may alternatively be envisaged that the keys R2 are updated on a regular basis, without first having detected an attack on the system. The decision to update one or more of the second feature transformation keys R2 may be taken by the AS 300, or by the BTS 400 which informs the AS 300 accordingly.

Figure 6:
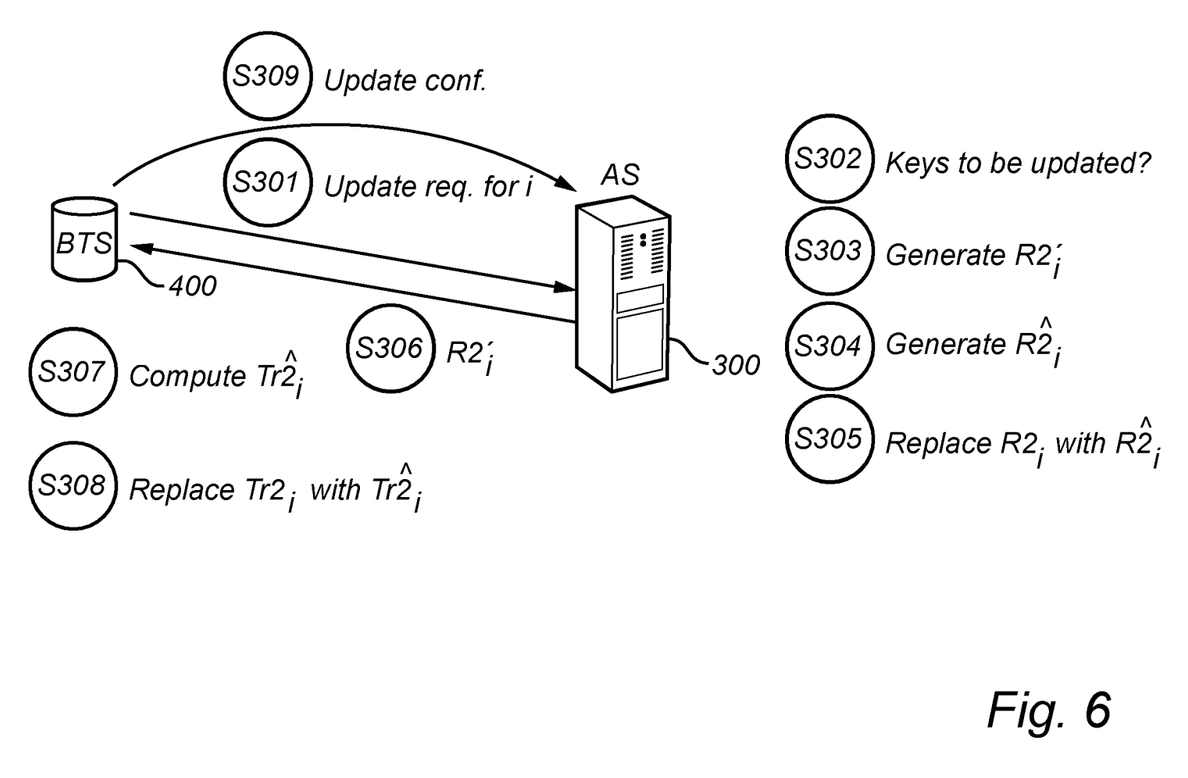
FIG. 6 illustrates a signaling diagram of updating feature transformation keys and stored sets of transformed biometric data according to an embodiment.

FIG. 6 illustrates an embodiment of the invention, where the BTS 400 determines that one or more enrolled second set of transformed biometric data Tr2 should be updated, for instance since an attack on the BTS 400 has been detected.

Accordingly, the BTS 400 sends an update request to the AS 300 in step S301 indicating which stored second sets of transformed biometric data $Tr2_i$ to be updated. It is noted that the BTS 400 may request anywhere from a single set to hundreds or even thousands of sets to be updated.

In an embodiment, the BTS 400 includes the user index i in the update request sent in step S301, which is unique for each enrolled second set of the transformed biometric data $Tr2_i$, in order to indicate to the AS 300 which particular second feature transformation keys $R2_i$ should be updated. This is preferably performed over an authenticated, and integrity and confidentiality protected channel for security reasons.

Upon receiving the update request, the AS 300 determines in step S302 which of the stored second feature transformation keys $R2_i$ should be updated from the received user indices $i_0, i_1, \ldots, i_{q-1}$ (i.e. a number of q keys are to be updated).

A couple of assumptions will be made in the following. Firstly, both the BTS 400 and the AS 300 stores a set of algorithm specific integers: $P=p_0, p_1, \ldots, p_{k-1}$.

Further, the second set of transformed biometric data is defined as:

$$Tr2_i = F(R2_i, T_i) = tr2_{i0}, tr2_{i1}, \ldots, tr2_{in-1} = [a_{i00}, a_{i01}, \ldots, a_{i0k-1}], [a_{i10}, a_{i11}, \ldots, a_{i1k-1}], \ldots, [a_{in-10}, a_{in-11}, \ldots, a_{in-1k-1}],$$

while the second feature transformation key is defined as:

$R2_i = R_{i0}, R_{i1}, \ldots, R_{in-1} = [r_{i00}, r_{i01}, \ldots, r_{i0k-1}],$
$[r_{i10}, r_{i11}, \ldots, r_{i1k-1}], \ldots, [r_{in-10}, r_{in-11}, \ldots, r_{in-1k-1}].$ The AS 300 will then perform the following feature transform key update operation. It is noted that when using the notation $X_{ij}$ in the following, what is meant is that i is an index to X, while j is a sub-index to i.

A good random source is used to generate random data in step S303. In a particular embodiment q×n×k random integer values are generated:

$\{R2'_{ij}\} = \{r'_{ijls}\}, 0 \le j \le q-1, 0 \le l \le n-1, 0 \le s \le k-1,$ and where each $0 \le r'_{ijls} < p_s$, i.e, $R2'_{ij} = R'_{ij0},$
$R'_{ij1}, \ldots, R'_{ijn-1} = [r'_{ij00}, r'_{ij01}, \ldots, r'_{ij0k-1}],$
$[r'_{ij10}, r'_{ij11}, \ldots, r'_{ij1k-1}], \ldots, [r'_{ijn-10}, r'_{ijn-11}, \ldots, r'_{ijn-1k-1}].$ Thereafter, new feature transformation keys $R2\hat{}_{ij}$ are generated in step S304 based on the random data. That is, for each key to be updated, as indicated by each index value $i_j$, the AS 300 computes:

$R2\hat{}_{ij} = \{r\hat{}_{ijls}\}, 0 \le l \le n-1, 0 \le s \le k-1,$ where $r\hat{}_{ijls} = r_{ijls} + r'_{ijls} \mod p_s$.

Thereafter, in step S305, each updated second feature transformation key $R2\hat{}_{ij}$ replaces each corresponding previously enrolled and stored key $R2_{ij}$.

The AS 300 transmits, in response to the received update request, the generated random data $R2'_{ij}$ to the BTS 400 in step S306. For reasons of security, the generated random data $R2'_{ij}$ is completely discarded at the AS 300 after having been transmitted to the BTS 400.

The BTS 400 will then perform the following update operation for the stored second sets of transformed biometric data $Tr2_i$ corresponding to the indicated user indices i sent in the update request of step S301.

The stored sets of transformed biometric data $Tr2_{ij}$ are updated in step S307 by processing the stored sets of transformed biometric data $Tr2_{ij}$ with the received random data $R2'_{ij}$ such that the updated sets of transformed biometric data $Tr2\hat{}_{ij}$ will match a set of biometric data T' of the user transformed with a feature transformation key $R2\hat{}_{ij}$ correspondingly updated based on the random data generated at the AS 300:

$Tr\hat{}_{ij} = \{a\hat{}_{ijls}\}, 0 \le l \le n-1, 0 \le s \le k-1,$ where $a\hat{}_{ijls} = a_{ijls} + r'_{ijls} \mod p_s$.

Thereafter, in step S308, each updated second set of transformed biometric data $Tr2\hat{}_{ij}$ replaces each corresponding previously stored enrolled set $Tr2_{ij}$, and the received random data $R2'_{ij}$ is completely discarded from the AS 300 after having been transmitted to the BTS 400.

The BTS 400 may optionally send an update confirmation to the AS 300 in step S309.

As can be concluded, the BTS 400 advantageously updates the stored sets of transformed biometric data $Tr2_{ij}$ (which were indicated in the update request of step S301) by processing the stored sets of transformed biometric data $Tr2_{ij}$ with the received random data $R2'_{ij}$ such that the updated sets of transformed biometric data $Tr2\hat{}_{ij}$ will match a set of biometric data T' of the user transformed with a feature transformation key $R2\hat{}_{ij}$ correspondingly updated based on the random data generated at the AS 300. That is: $Tr2\hat{}_{ij} = F(T', R2\hat{}_{ij})$.

Thus, upon performing an authentication procedure (again with reference to FIG. 5), the AS 300 will—after the first set of transformed biometric data Tr1' has been matched to Tr1 at the BTS 400 in step S204, and the index i has been received in step S205—send an updated second feature transformation key $R2\hat{}$ corresponding to the received index i to the local station 500 in step S206 (the updated second feature transformation key $R2\hat{}$ being encrypted at the AS 300 in step S207 with a key shared with the local station 500 for security reasons), and the user will utilize the updated second feature transformation key $R2\hat{}$ to transform captured biometric data T', resulting in a set of transformed biometric data: $Tr2\hat{}' = F(R2\hat{}, T')$.

The set of transformed biometric data: $Tr2\hat{}'$ will be encrypted and sent to the AS 300 in step S209, which in its turn will forward the encrypted set of transformed biometric data $E(Tr2\hat{}')$ to the BTS 400 in step S210.

The BTS 400 will decrypt the received data in step S211 and compare $Tr2\hat{}'$ with the corresponding set of transformed biometric data that previously was updated in step S307 and stored in step S308 of FIG. 6.

If the updated set of transformed biometric data $Tr2\hat{}$ matches the received $Tr2\hat{}'$ in step S211, the user 200 is considered authenticated, and a confirmation may be sent accordingly to the AS 300 in step S213 in the form of the index i for which there is a match.

Advantageously, the authentication has been undertaken with an updated second transformation key $R2\hat{}'$ and a correspondingly updated set of transformed biometric data $Tr2\hat{}$ without involving the user 200 in the update procedure.

Further advantageous is that the second feature transformation key that was stored at the AS 300 prior to being updated is now obsolete, and thus cannot be used by a potential malicious third party having access to the key. The updating of the second feature transformation key may be performed on a regular basis. Hence, a computed new second feature transformation key may be updated after a set time period, such that all second feature transformation keys stored at the AS 300—and the corresponding second sets of transformed biometric data stored at the BTS 400—are continuously updated.

Again with reference to FIG. 6, in an alternative embodiment where the AS 300 itself determines that one or more stored second feature transformation keys R2 is to be updated, the BTS 400 will not send an updated request in step S301. However, in such an embodiment the AS 300 includes, upon transmitting the random data to the BTS 400 in step S306, the user index i for each key that has been updated, such that the BTS 400 is made aware of which corresponding sets of transformed biometric data Tr2 to update accordingly.

As is understood, the update of the second feature transformation key performed by the AS 300—and the subsequent update of the corresponding set of transformed biometric data at the BTS 400—can be performed at any time, even during an ongoing authentication procedure as described with reference to FIG. 5, as long as the BTS 400 has updated the stored set of transformed biometric data when the BTS 400 receives a biometric template T' having been transformed with an updated second feature transformation key $R2\hat{}$, i.e. before receiving the set of biometric data $Tr2\hat{}'$ having been transformed with the updated key, such that adequate set s of transformed biometric data $Tr2\hat{}$ and $Tr2\hat{}'$ are matched to each other.

It should further be noted that during enrollment and authentication of a user 200, the enrollment being performed at the first client device 100 and the authentication either being performed at the first client device 100 or the second client device 500; authenticity of data sent between the nodes of the system is generally provided with an indication of authenticity, for example in the form of digital signatures, Message Authentication Codes (MACs), protected session values, etc. Hence, in order to provide a high level of trust and security, it is preferable that a recipient is capable of verifying that a transmitter indeed is a trusted party.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a network node of updating at least one stored feature transformation key with which a set of biometric data of a user initially has been transformed at a first client device at which the biometric data of the user was captured and enrolled with the network node, which set of transformed biometric data of the user is stored at a biometric data verification node without the biometric data verification node having access to the feature transformation key, comprising: determining that said at least one stored transformation key is to be updated; generating random data; computing at least one new feature transformation key based on said random data; replacing the at least one stored feature transformation key with the computed at least one new feature transformation key; and transmitting the generated random data to the biometric data verification node, wherein the biometric data verification node uses the generated random data to update the at least one set of transformed biometric data which initially was transformed using the replaced at least one feature transformation key.

2. The method of claim 1, wherein the computation of the at least one new feature transformation key based on said random data is performed by: adding the generated random data to the at least one stored feature transformation key.

3. The method of claim 1, further comprising: receiving a request from the biometric data verification node to update said at least one stored transformation key, the request comprising a unique identifier of said at least one stored transformation key to be updated.

4. The method of claim 1, wherein transmission of the generated random data to the biometric data verification node further comprises a unique identifier of said at least one stored transformation key having been updated.

5. The method of claim 1, further comprising: receiving, from a second client device, an encrypted first set of transformed biometric data of the user, the first set of biometric data having been transformed by a first feature transformation key and encrypted with a key shared between the second client device and the biometric data verification node, along with user profile data; transmitting the encrypted first set of transformed biometric data and the user profile data to the biometric data verification node; receiving, from the biometric data verification node, a user index associated with each of at least one set of transformed biometric data having been previously enrolled at the biometric data verification node and which transformed biometric data matches the submitted first set of transformed biometric data; fetching a second feature transformation key corresponding to each received user index, the second feature transformation key being either a feature transformation key previously enrolled by the first client device or a computed new feature transformation key; encrypting the fetched at least one second feature transformation key with a key shared with the second client device; transmitting the encrypted at least one second feature transformation key to the second client device; receiving, from the second client device, an encrypted at least one second set of transformed biometric data having been transformed with the at least one second feature transformation key, the at least one second set of transformed biometric data having been encrypted with a key shared between the second client device and the biometric data verification node; transmitting, to the biometric data verification node, the encrypted at least one second set of transformed biometric data; and receiving, from the biometric data verification node, the user index associated with each of at least one stored set of transformed biometric data for which there is a match with the at least one second set of transformed biometric data transformed at the second client device using the second feature transformation key, wherein the user is considered authenticated.

6. A computer program product comprising a non-transitory computer readable medium, the computer readable medium having a computer program embodied thereon comprising computer-executable instructions for causing the network node to perform steps recited in claim 1 when the computer-executable instructions are executed on at least one processor included in the network node.

7. A method performed by a biometric data verification node of updating at least one stored set of transformed biometric data of a user initially transformed at a first client device at which the biometric data of the user was captured and enrolled with the biometric data verification node, comprising: receiving, from a network node having access to a feature transformation key that was used to transform the stored set of transformed biometric data to be updated, random data to be used for updating the stored set of transformed biometric data to be updated; updating the at least one stored set of transformed biometric data by processing the stored set of transformed biometric data with the received random data such that the updated set of transformed biometric data will match a set of biometric data of the user transformed with a feature transformation key correspondingly updated based on said random data generated at the network node; and replacing the at least one stored set of transformed biometric data with the updated set of transformed biometric data.

8. The method of claim 7, wherein the update of the at least one stored set of transformed biometric data is performed by: adding the generated random data to the at least one stored set of biometric data.

9. The method of claim 7, further comprising: transmitting a request to the network node to update said at least one stored transformation key, the request comprising a unique identifier of said at least one stored transformation key to be updated.

10. The method of claim 7, further comprising: receiving, from network node configured to communicate with the second client device, an encrypted first set of transformed biometric data of the user, the first set of biometric data having been transformed by a first feature transformation key and encrypted with a key shared with the second client device, along with user profile data; decrypting the encrypted first set of transformed biometric data; matching the decrypted first set of transformed biometric data to at least one set of transformed biometric data having been previously enrolled for the received user profile data; transmitting, to the network node, a user index associated with each of at least one set of transformed biometric data having been previously enrolled at the biometric data verification node and for which there is a match with the received first set of transformed biometric data; receiving, from the network node, an encrypted at least one second set of transformed biometric data having been transformed by the second client device with a second feature transformation key stored at the network node, the second key being either a feature transformation key previously enrolled by the first client device or a computed new feature transformation key, the at least one second set of transformed biometric data having been encrypted with a key shared with the second client device; decrypting the encrypted at least one second set of transformed biometric data; matching the decrypted at least one second set of transformed biometric data to at least one stored set of transformed biometric data being either a set of transformed biometric data previously enrolled by the first client device or an updated set of transformed biometric data; and transmitting, to the network node, at least one user index for which there is match, wherein the user is considered authenticated.

11. A computer program product comprising a non-transitory computer readable medium, the computer readable medium having the computer program embodied thereon comprising computer-executable instructions for causing the biometric data verification node to perform steps recited in claim 7 when the computer-executable instructions are executed on at least one processor included in the biometric data verification node.

12. A network node configured to update at least one stored feature transformation key with which a set of biometric data of a user initially has been transformed at a first client device at which the biometric data of the user was captured and enrolled with the network node, which set of transformed biometric data of the user is stored at a biometric data verification node without the biometric data verification node having access to the feature transformation key, the network node comprising a hardware processor and a hardware memory configured to cause the network node to be operative to: determine that said at least one stored transformation key is to be updated; generate random data; compute at least one new feature transformation key based on said random data; replace the at least one stored feature transformation key with the computed at least one new feature transformation key; and transmit the generated random data to the biometric data verification node, wherein the biometric data verification node uses the generated random data to update the at least one set of transformed biometric data which initially was transformed using the replaced at least one feature transformation key.

13. The network node of claim 12, further being operative to, upon computing the at least one new feature transformation key based on said random data: add the generated random data to the at least one stored feature transformation key.

14. The network node of claim 12, further being operative to: receive a request from the biometric data verification node to update said at least one stored transformation key, the request comprising a unique identifier of said at least one stored transformation key to be updated.

15. The network node of claim 12, further being operative to include a unique identifier of said at least one stored transformation key having been updated with the transmission of the generated random data to the biometric data verification node.

16. The network node of claim 12, further being operative to: receive, from a second client device, an encrypted first set of transformed biometric data of the user, the first set of biometric data having been transformed by a first feature transformation key and encrypted with a key shared between the second client device and the biometric data verification node, along with user profile data; transmit the encrypted first set of transformed biometric data and the user profile data to the biometric data verification node; receive, from the biometric data verification node, a user index associated with each of at least one set of transformed biometric data having been previously enrolled at the biometric data verification node and which transformed biometric data matches the submitted first set of transformed biometric data; fetch a second feature transformation key corresponding to each received user index, the second feature transformation key being either a feature transformation key previously enrolled by the first client device or a computed new feature transformation key; encrypt the fetched at least one second feature transformation key with a key shared with the second client device; transmit the encrypted at least one second feature transformation key to the second client device; receive, from the second client device, an encrypted at least one second set of transformed biometric data having been transformed with the at least one second feature transformation key, the at least one second set of transformed biometric data having been encrypted with a key shared between the second client device and the biometric data verification node; transmit, to the biometric data verification node, the encrypted at least one second set of transformed biometric data; and receive, from the biometric data verification node, the user index associated with each of at least one stored set of transformed biometric data for which there is a match with the at least one second set of transformed biometric data transformed at the second client device using the second feature transformation key, wherein the user is considered authenticated.

17. A biometric data verification node configured to update at least one stored set of transformed biometric data of a user initially transformed at a first client device at which the biometric data of the user was captured and enrolled with the biometric data verification node, the biometric data verification node comprising a hardware processor and hardware memory configured to cause the biometric data verification node to be operative to: receive, from a network node having access to a feature transformation key that was used to transform the stored set of transformed biometric data to be updated, random data to be used for updating the stored set of transformed biometric data to be updated; update the at least one stored set of transformed biometric data by processing the stored set of transformed biometric data with the received random data such that the updated set of transformed biometric data will match a set of biometric data of the user transformed with a feature transformation key correspondingly updated based on said random data generated at the network node; and replace the at least one stored set of transformed biometric data with the updated set of transformed biometric data.

18. The biometric data verification node of claim 17, further being operative to, upon updating the at least one stored set of transformed biometric data: add the generated random data to the at least one stored set of biometric data.

19. The biometric data verification node of claim 17, further being operative to receive a unique identifier of said at least one stored transformation key having been updated with the reception of the generated random data from the network node.

20. The biometric data verification node of claim 17, further being operative to: receive, from network node configured to communicate with the second client device, an encrypted first set of transformed biometric data of the user, the first set of biometric data having been transformed by a first feature transformation key and encrypted with a key shared with the second client device, along with user profile data; decrypt the encrypted first set of transformed biometric data; match the decrypted first set of transformed biometric data to at least one set of transformed biometric data having been previously enrolled for the received user profile data; transmit, to the network node, a user index associated with each of at least one set of transformed biometric data having been previously enrolled at the biometric data verification node and for which there is a match with the received first set of transformed biometric data; receive, from the network node, an encrypted at least one second set of transformed biometric data having been transformed by the second client device with a second feature transformation key stored at the network node, the second key being either a feature transformation key previously enrolled by the first client device or a computed new feature transformation key, the at least one second set of transformed biometric data having been encrypted with a key shared with the second client device; decrypt the encrypted at least one second set of transformed biometric data; match the decrypted at least one second set of transformed biometric data to at least one stored set of transformed biometric data being either a set of transformed biometric data previously enrolled by the first client device or an updated set of transformed biometric data; and transmit, to the network node, at least one user index for which there is match, wherein the user is considered authenticated.

* * * * *